United States Patent
Kamon et al.

(10) Patent No.: US 11,878,414 B2
(45) Date of Patent: Jan. 23, 2024

(54) JOINT STRUCTURE OF ROBOT

(71) Applicant: KAWASAKI JUKOGYO KABUSHIKI KAISHA, Kobe (JP)

(72) Inventors: Masayuki Kamon, Kobe (JP); So Yukizaki, Kobe (JP); Junichi Karasuyama, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 159 days.

(21) Appl. No.: 17/432,965

(22) PCT Filed: Mar. 10, 2020

(86) PCT No.: PCT/JP2020/010355
§ 371 (c)(1),
(2) Date: Aug. 23, 2021

(87) PCT Pub. No.: WO2020/184574
PCT Pub. Date: Sep. 17, 2020

(65) Prior Publication Data
US 2022/0152813 A1    May 19, 2022

(30) Foreign Application Priority Data

Mar. 14, 2019   (JP) .................. 2019-046901

(51) Int. Cl.
*B25J 9/10*   (2006.01)
*B25J 9/12*   (2006.01)
*B25J 17/00*  (2006.01)

(52) U.S. Cl.
CPC .............. *B25J 9/106* (2013.01); *B25J 9/123* (2013.01); *B25J 17/00* (2013.01)

(58) Field of Classification Search
CPC ... B25J 9/0006; B25J 9/06; B25J 9/106; B25J 9/123; B25J 17/00; B25J 17/0241; B25J 18/00
(Continued)

(56) References Cited

U.S. PATENT DOCUMENTS

2006/0015214 A1   1/2006   Sugawara et al.
2013/0104686 A1   5/2013   Yamazaki
(Continued)

FOREIGN PATENT DOCUMENTS

CN   106166740 A  *  11/2016
CN   107243886 A  *  10/2017
(Continued)

OTHER PUBLICATIONS

KR 101800282 B1 (Ryu Jae Kwan) (full text). [online] [retrieved on Mar. 13, 2023]. Retrieved from: Clarivate Analytics (Year: 2017).*

*Primary Examiner* — Joseph Brown
(74) *Attorney, Agent, or Firm* — METROLEX IP LAW GROUP, PLLC (57) ABSTRACT

A joint structure of a robot according to an embodiment may include first link member, a second link member, a first movable link and a second movable link, disposed so as to intersect with each other and configured to rotatably couple the first link member to the second link member, and a linear-movement actuator connected at a base-end part thereof to the first link member, and connected at a tip-end part thereof to the first movable link. The second link member relatively pivots to the first link member by the linear-movement actuator advancing and retreating.

5 Claims, 9 Drawing Sheets

(58) Field of Classification Search
USPC .................................................. 901/15, 28
See application file for complete search history.

(56) References Cited

U.S. PATENT DOCUMENTS

| | | | |
|---|---|---|---|
| 2018/0116828 A1* | 5/2018 | Quinn | B25J 9/0006 |
| 2018/0185231 A1* | 7/2018 | Huang | A61H 1/0288 |
| 2018/0290295 A1 | 10/2018 | Nagatsuka | |

FOREIGN PATENT DOCUMENTS

| | | | |
|---|---|---|---|
| DE | 202017107583 U1 * | 5/2018 | |
| JP | 4236900 B2 | 3/2009 | |
| JP | 2013-094891 A | 5/2013 | |
| JP | 2016-209983 A | 12/2016 | |
| KR | 101800282 B1 * | 12/2017 | |
| WO | 2011/155957 A1 | 12/2011 | |

* cited by examiner

JOINT STRUCTURE OF ROBOT

CROSS REFERENCE TO RELATED APPLICATIONS

This application is a national stage entry of International Application No. PCT/JP2020/010355, filed on Mar. 10, 2020, which claims priority based on the Article 8 of Patent Cooperation Treaty from the prior Japanese Patent Application No. 2019-046901, filed on Mar. 14, 2019, the entire contents of all of which are incorporated herein by reference.

TECHNICAL FIELD

The present disclosure relates to a joint structure of a robot.

BACKGROUND ART

In walking humanoid robots, it is known that, when a bending angle of a knee joint increases, a knee torque which acts on the knee joint as a load increases (for example, see Patent Document 1). In a 2-joint motion variable-speed linkage mechanism disclosed in Patent Document 1, based on a hypothesis in which a bending angle of an ankle increases as the knee torque increases, a knee linkage mechanism which is comprised of a 4-joint linkage mechanism operates so that a reduction ratio increases, while interlocking with operation of an ankle linkage mechanism according to the increase in the ankle angle.

Moreover, a joint structure of a robot aiming at increasing a movable range (rotating angle) of the joint in a bend direction is known (for example, see Patent Document 2). In the joint structure of the robot disclosed in Patent Document 2, a first main link in which rotation axes A and B are provided and a second main link in which rotation axes C and D are provided are coupled by two movable links disposed so as to intersect with each other.

According to the joint structure, the first main link is comprised of a first plate and a second plate which are disposed in parallel to each other. One of the movable links is rotatably connected with the first plate and the second plate through the rotation axis A, and the other movable link is rotatably connected only with the first plate through the rotation axis B to increase the movable range (rotating angle) of the joint in the bend direction.

REFERENCE DOCUMENTS OF CONVENTIONAL ART

Patent Documents

[Patent Document 1] JP2016-209983A
[Patent Document 2] JP4,236,900B2

DESCRIPTION OF THE DISCLOSURE

Problem to be Solved by the Disclosure

Meanwhile, the present inventors reached a joint structure of a robot, which is different from the 2-joint motion variable-speed linkage mechanism disclosed in Patent Document 1 and the joint structure of the robot disclosed in Patent Document 2 which are described above. One purpose of the present disclosure is to provide a joint structure of a robot having a novel structure.

Summary of the Disclosure

A joint structure of a robot according to the present disclosure includes a first link member through which a first shaft member and a second shaft member are inserted, a second link member through which a third shaft member and a fourth shaft member are inserted, a first movable link and a second movable link, disposed so as to intersect with each other and configured to rotatably couple the first link member to the second link member through the first to fourth shaft members, and a linear-movement actuator connected at a base-end part thereof to the first link member. A tip-end part of the linear-movement actuator is rotatably connected to the first movable link. The second link member relatively pivots to the first link member by the linear-movement actuator advancing and retreating.

According to this structure, a required torque can be secured when a bending angle of the joint increases, without increasing a size of a motor which constitutes the linear-movement actuator, and therefore, the robot can be downsized.

Effect of the Disclosure

According to the joint structure of the robot of the present disclosure, the required torque can be secured when the bending angle of the joint increases, without increasing the size of the motor which constitutes the linear-movement actuator, and therefore, the robot can be downsized.

MODE FOR CARRYING OUT THE DISCLOSURE

Hereinafter, one embodiment of the present disclosure is described with reference to the drawings. Note that, throughout the drawings, the same reference characters are assigned to the same or corresponding parts to omit redundant description. Moreover, throughout the drawings, components for explaining the present disclosure are selectively illustrated, and illustration of other components may be omitted. Moreover, the present disclosure is not limited to the following embodiment.

Embodiment 1

A joint structure of a robot according to Embodiment 1 includes a first link member into which a first shaft member and a second shaft member are inserted, a second link member into which a third shaft member and a fourth shaft member are inserted, a first movable link and a second movable link, disposed so as to intersect with each other and configured to rotatably couple the first link member to the second link member through the first to fourth shaft members, and a linear-movement actuator connected at a base-end part thereof to the first link member. The first movable link is rotatably connected with a tip-end part of the linear-movement actuator so that the second link member relatively pivots to the first link member by the linear-movement actuator advancing and retreating.

Moreover, in the joint structure of the robot according to Embodiment 1, the first movable link may rotatably couple the first link member to the second link member through the first shaft member and the third shaft member, and the second movable link may rotatably couple the first link member to the second link member through the second shaft member and the fourth shaft member.

Moreover, in the joint structure of the robot according to Embodiment 1, an extended part may be provided to an end part of the first movable link on the second link member side, and the extended part may be rotatably connected to the tip-end part of the linear-movement actuator.

Moreover, in the joint structure of the robot according to Embodiment 1, the first movable link may be formed so as to be curved in order not to interfere with the second shaft member.

Moreover, in the joint structure of the robot according to Embodiment 1, the first movable link may be formed in a V-shape.

Moreover, in the joint structure of the robot according to Embodiment 1, the extended part of the first movable link may be formed so as to extend toward the first link member, when the first link member and the second link member are disposed linearly.

Hereinafter, one example of the joint structure of the robot according to Embodiment 1 is described with reference to FIGS. 1 to 9.

[Configuration of Joint Structure of Robot]

Figure 1:
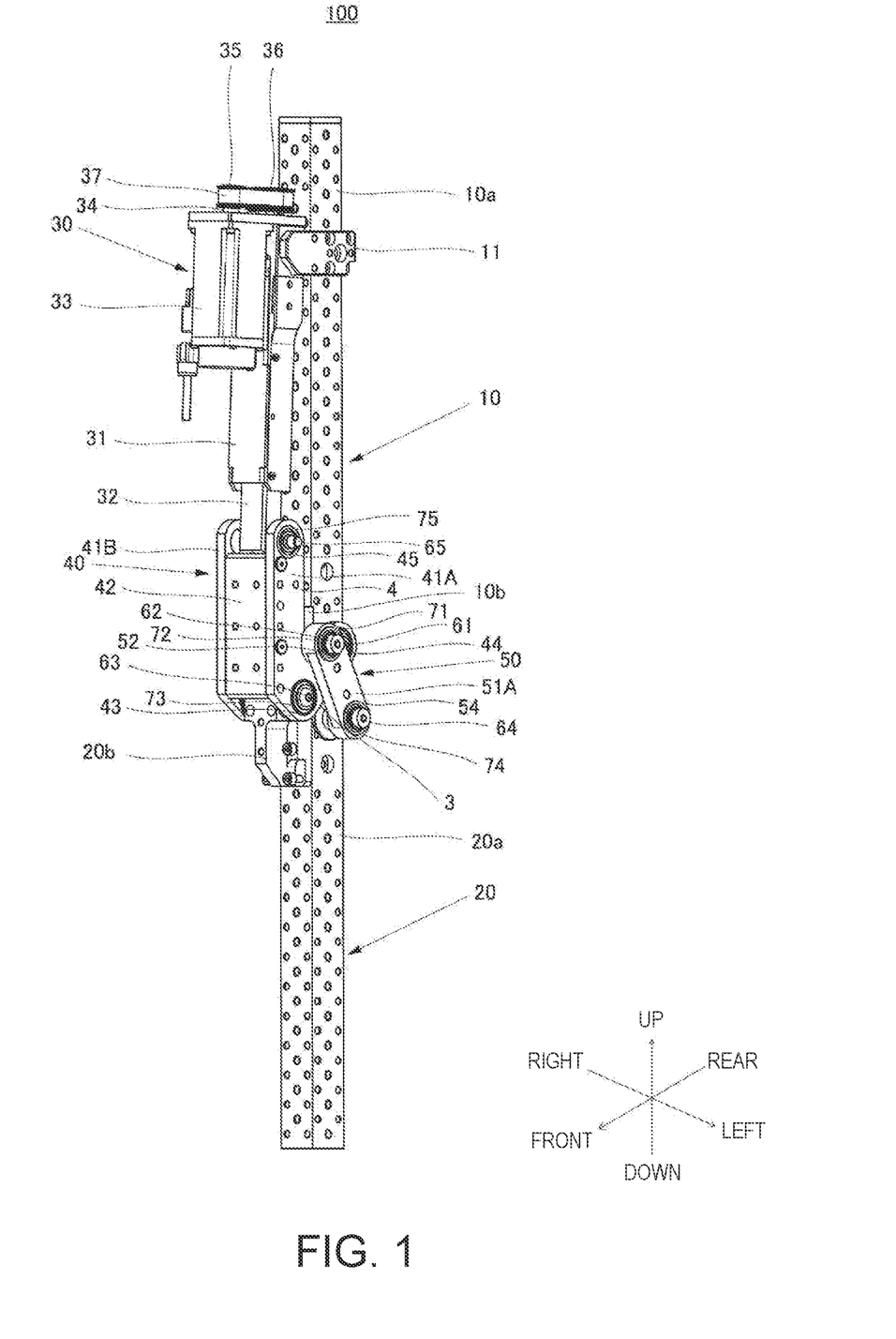
FIG. 1 is a perspective view illustrating an outline configuration of a joint structure of a robot according to Embodiment 1.
Figure 2:
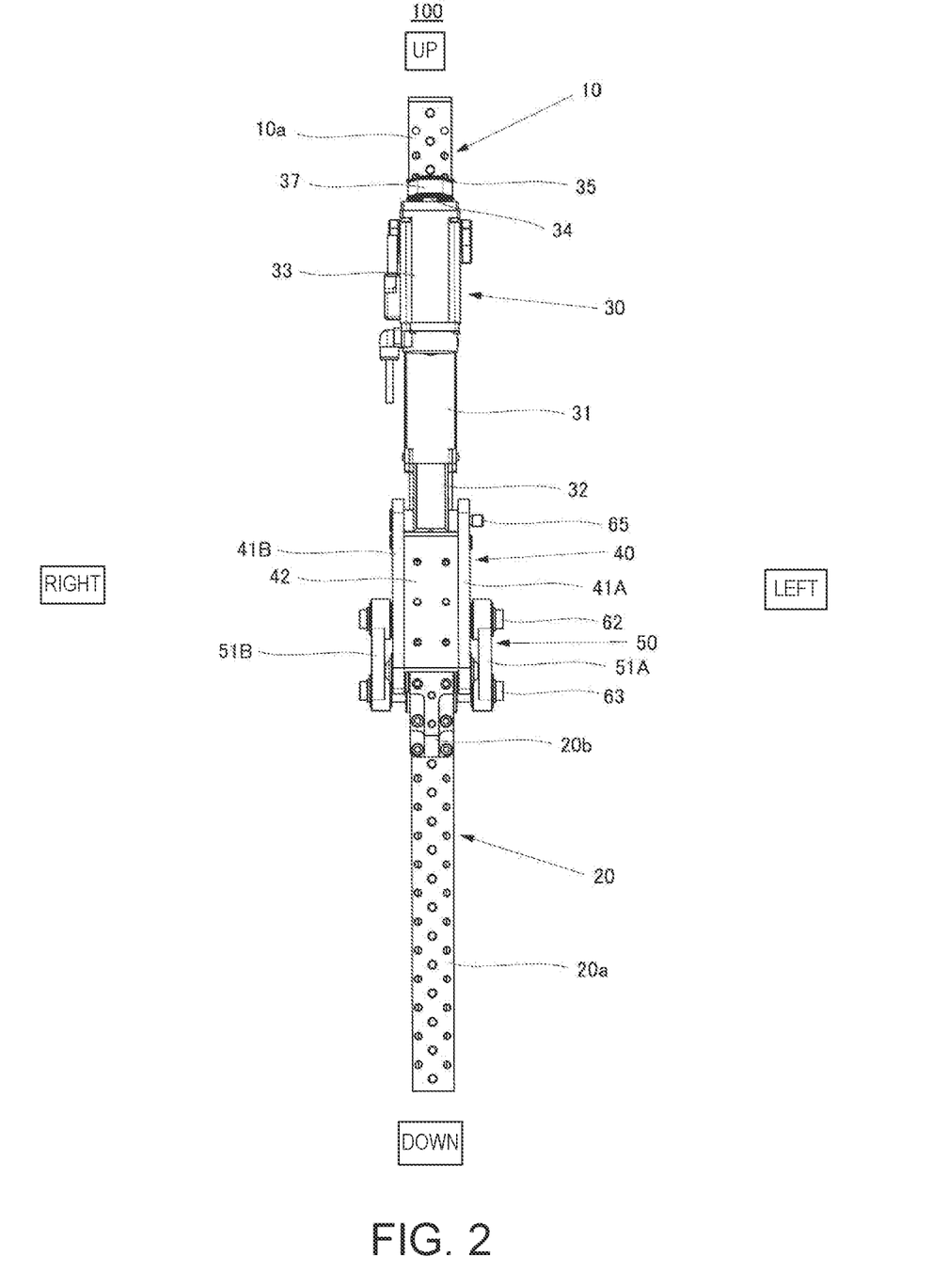
FIG. 2 is a front view of the joint structure of the robot illustrated in FIG. 1.
Figure 3:
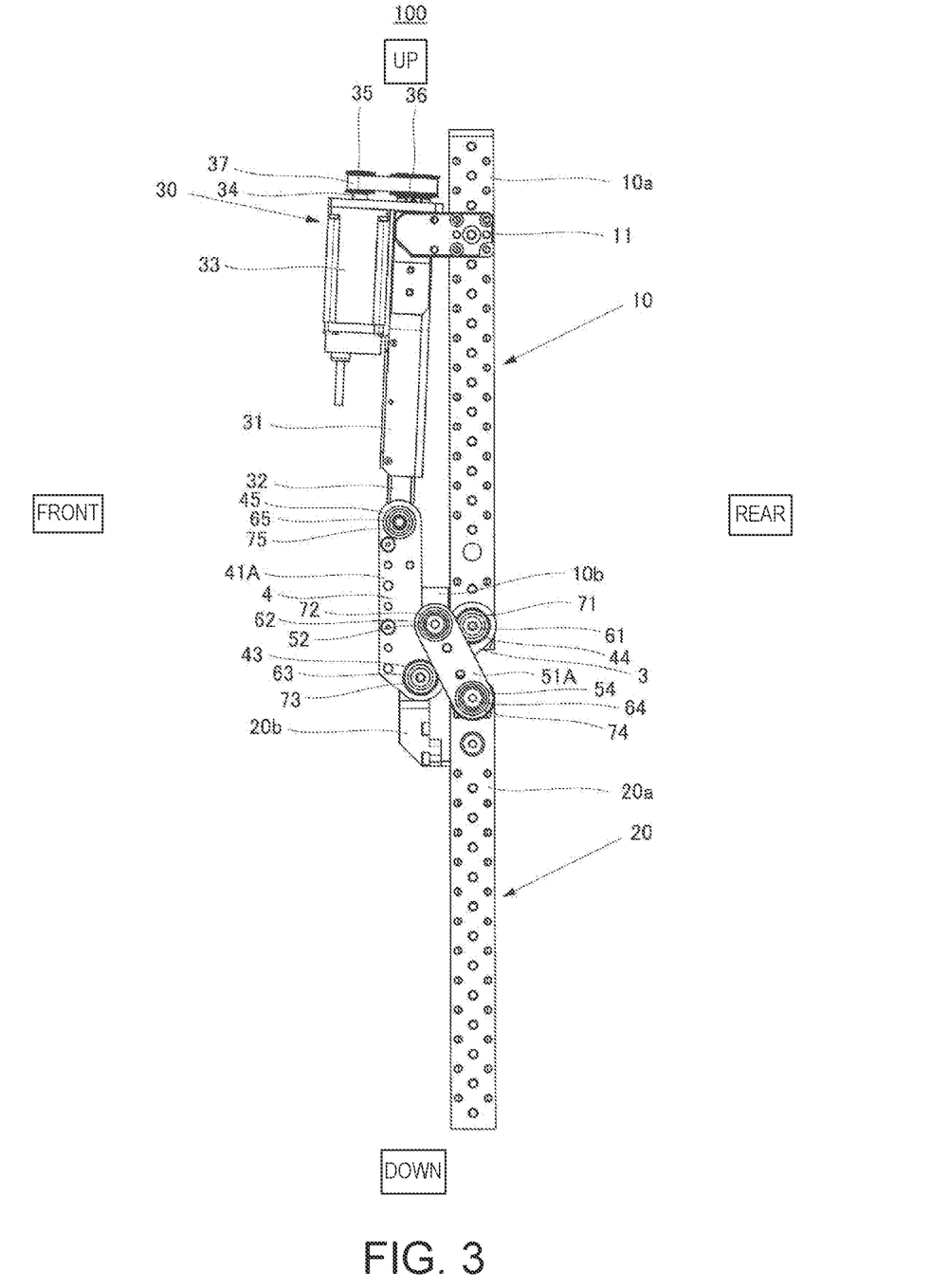
FIG. 3 is a side view of the joint structure of the robot illustrated in FIG. 1.
Figure 4:
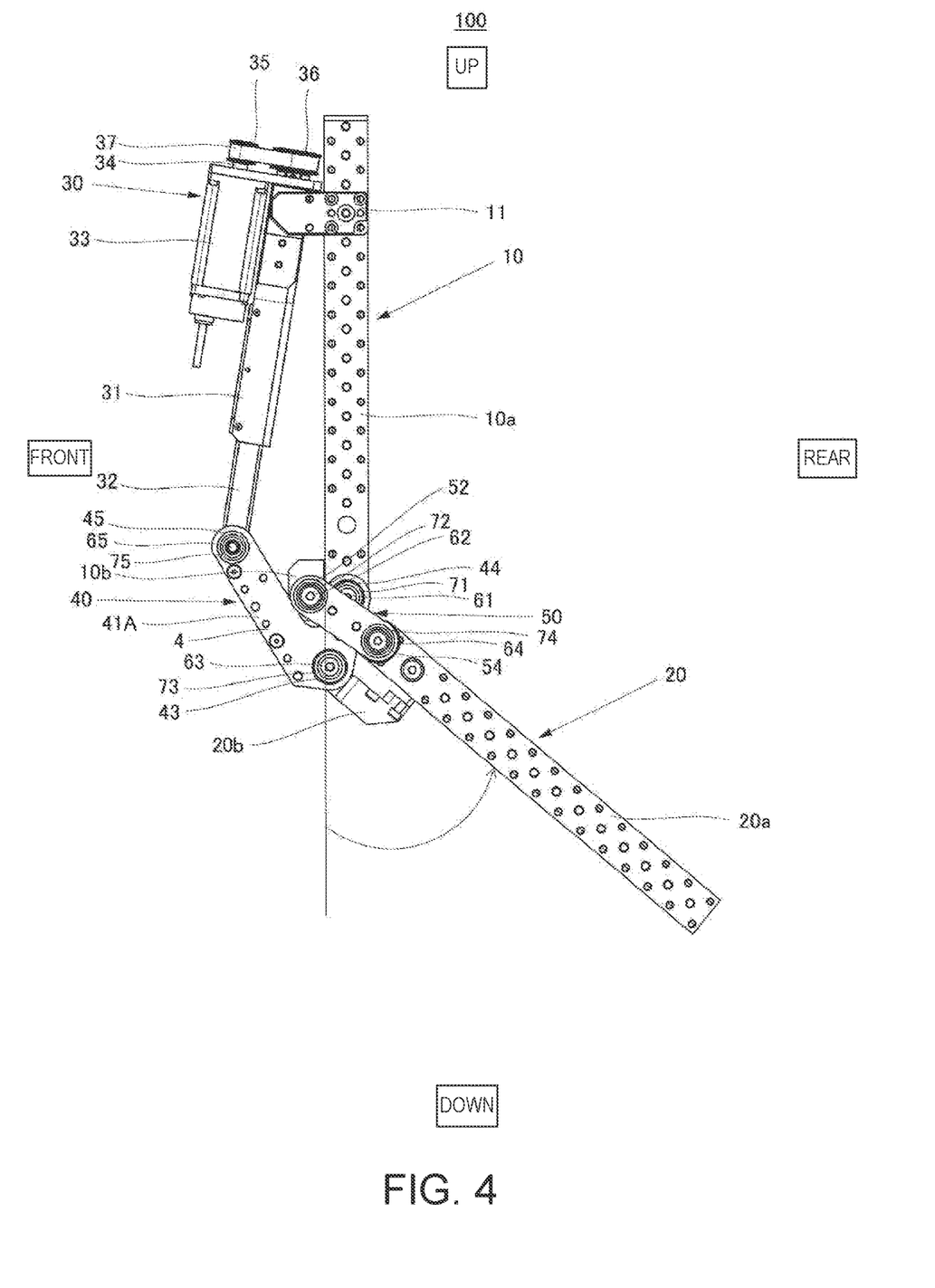
FIG. 4 is a side view of the joint structure of the robot illustrated in FIG. 1.
Figure 5:
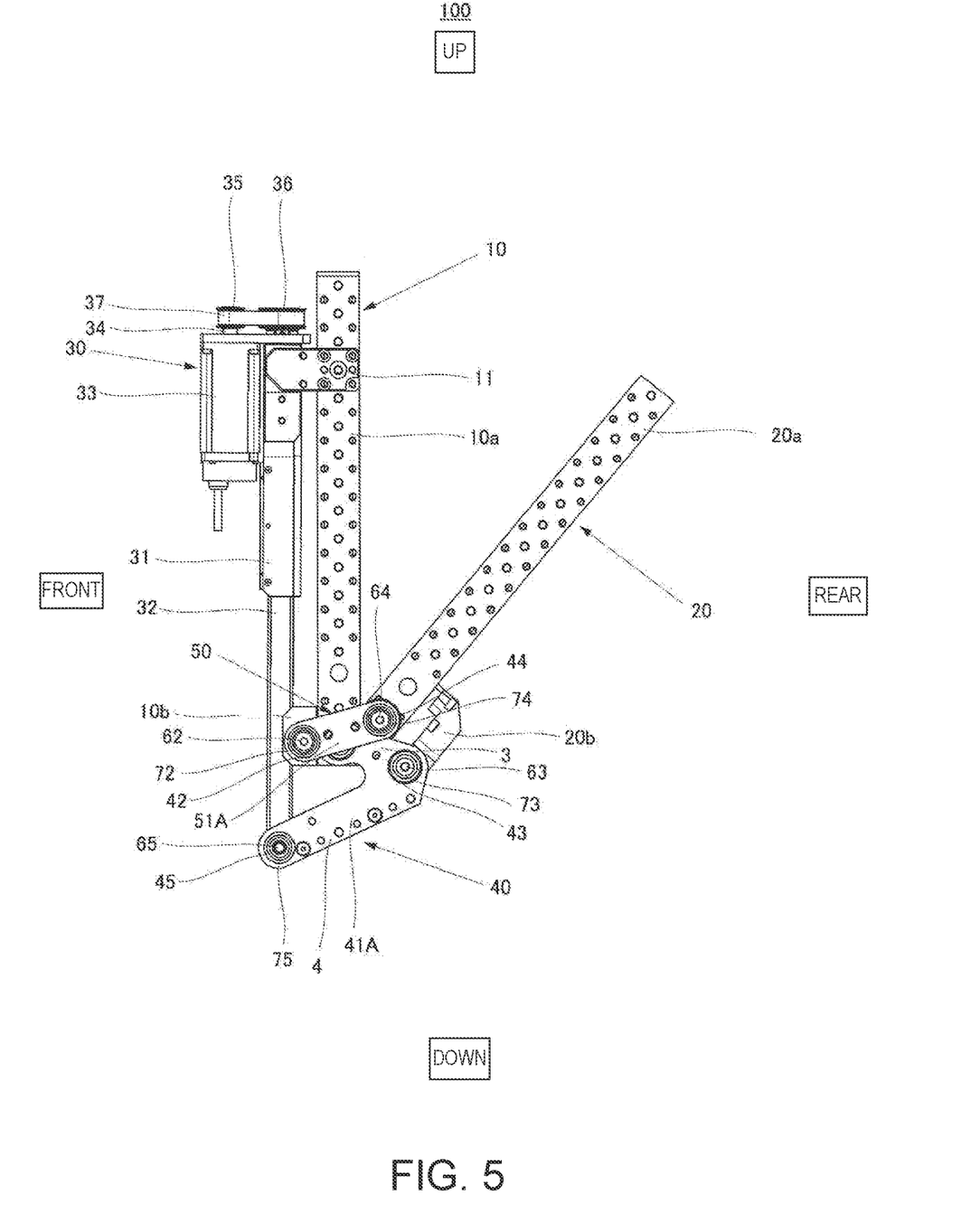
FIG. 5 is a side view of the joint structure of the robot illustrated in FIG. 1.
Figure 6:
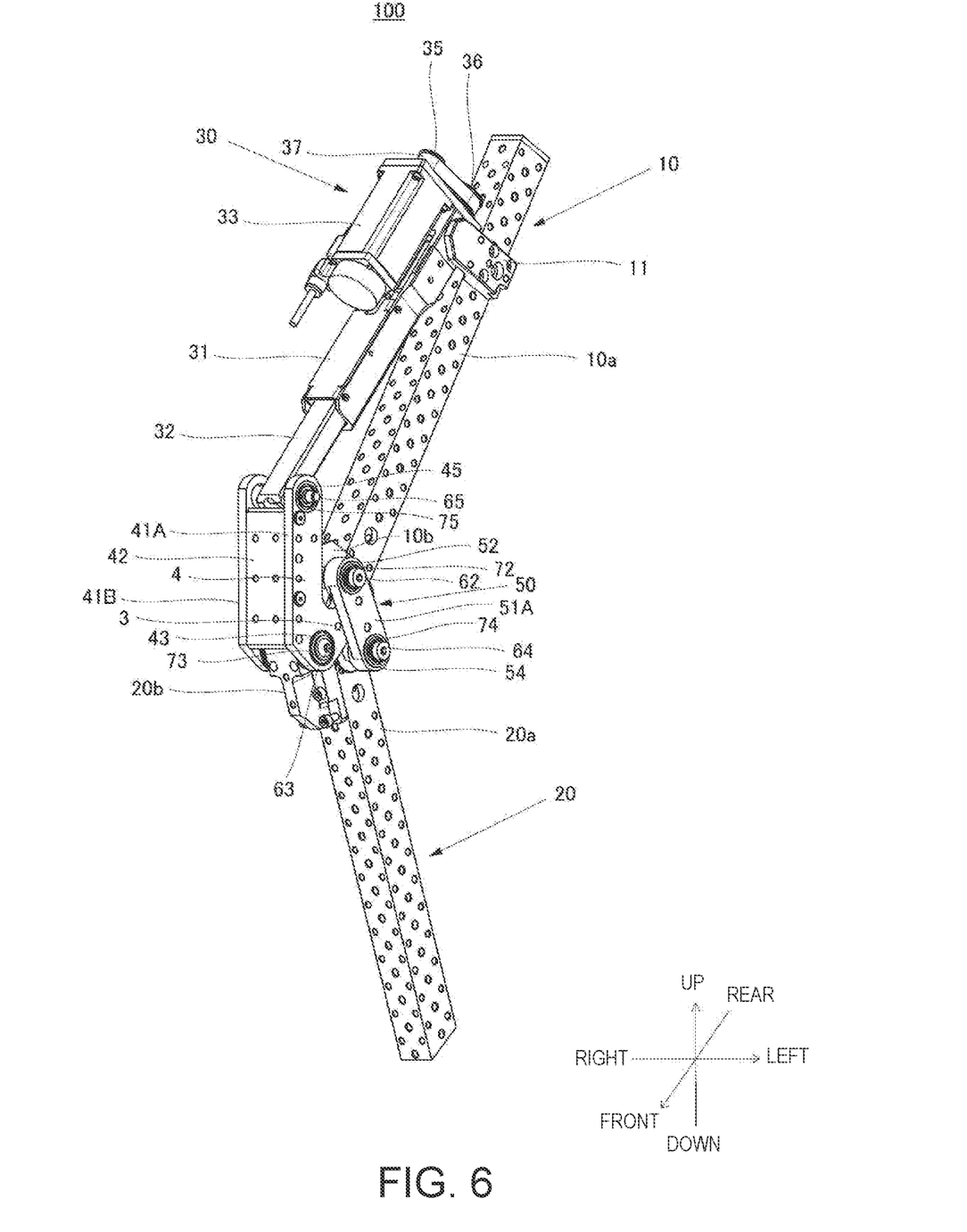
FIG. 6 is a perspective view of the joint structure of the robot illustrated in FIG. 1.
Figure 7:
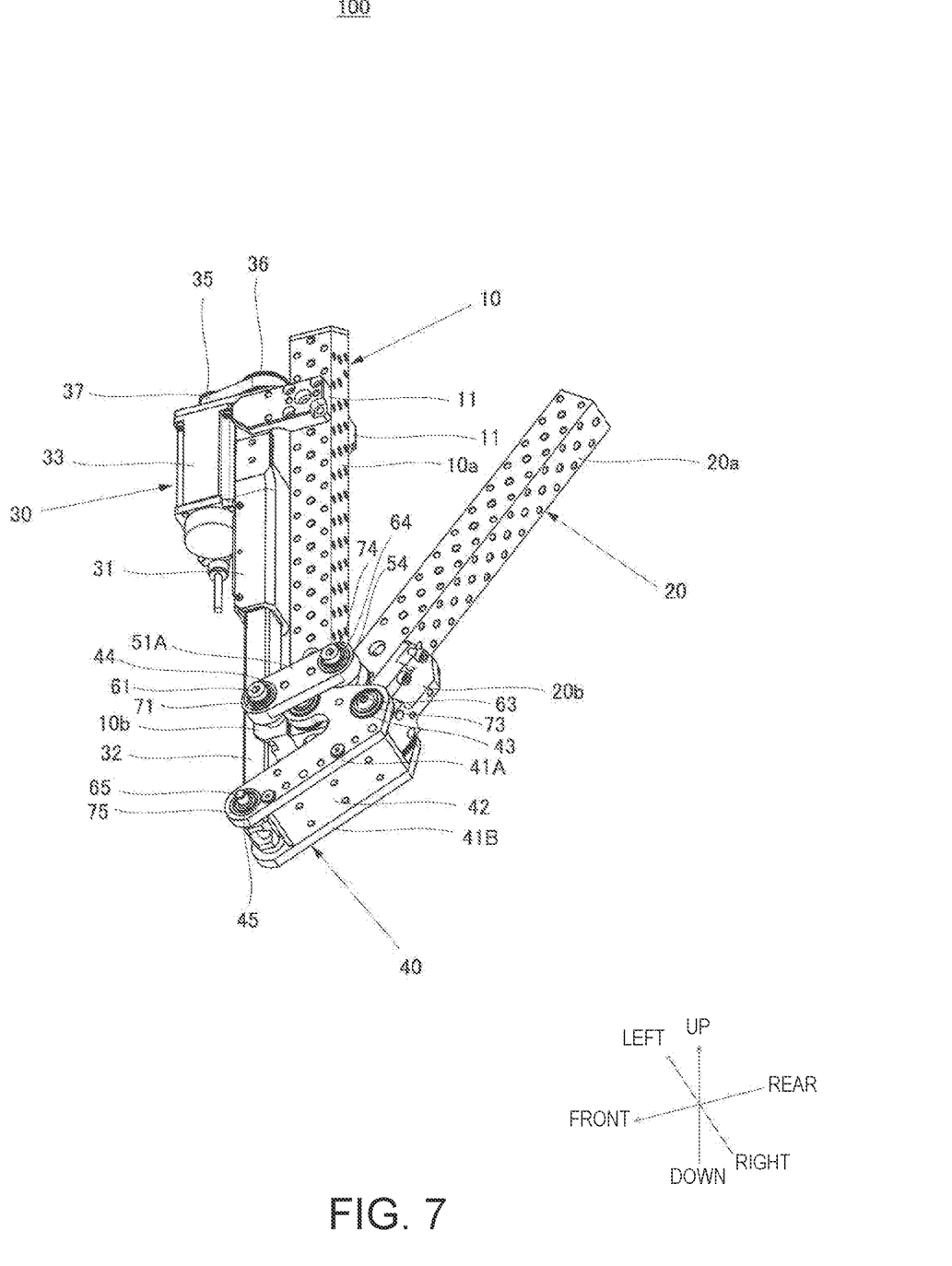
FIG. 7 is a perspective view of the joint structure of the robot illustrated in FIG. 1.

FIG. 1 is a perspective view illustrating an outline configuration of the joint structure of the robot according to Embodiment 1. FIG. 2 is a front view of the joint structure of the robot illustrated in FIG. 1. FIGS. 3 to 5 are side views of the joint structure of the robot illustrated in FIG. 1. FIGS. 6 and 7 are perspective views of the joint structure of the robot illustrated in FIG. 1.

Note that, in FIGS. 1, 6, and 7, an up-and-down direction, a front-and-rear direction, and a left-and-right direction of the joint structure of the robot are expressed as an up-and-down direction, a front-and-rear direction, and a left-and-right direction in the drawings. Moreover, in FIG. 2, the up-and-down direction and the left-and-right direction of the joint structure of the robot are expressed as an up-and-down direction and a left-and-right direction in the drawing. Moreover, in FIGS. 3 to 5, the up-and-down direction and the front-and-rear direction of the joint structure of the robot are expressed as an up-and-down direction and a front-and-rear direction in the drawings.

As illustrated in FIGS. 1 to 7, the joint structure 100 of the robot according to Embodiment 1 includes a first link member 10, a second link member 20, a linear-movement actuator 30, a first movable link 40, and a second movable link 50. When the linear-movement actuator 30 advances and retreats, the second link member 20 relatively pivots to the first link member 10.

Note that, in the joint structure 100 of the robot according to Embodiment 1, for example, the first link member 10 may constitute an upper thigh part of the robot and the second link member 20 may constitute a lower thigh part of the robot, or the first link member 10 may constitute an upper arm part of the robot and the second link member 20 may constitute a forearm part.

The first link member 10 has a first body part 10a and a first protrusion 10b. The first body part 10a is formed in a bar shape (rectangular parallelepiped shape), and the first protrusion 10b is provided to a front surface of the lower end part thereof so as to protrude forward.

Moreover, through-holes (not illustrated) are formed in side surfaces of the lower end part of the first body part 10a, and a first shaft member 61 and a bearing member (not illustrated) are fitted in the through-holes. Similarly, through-holes (not illustrated) are formed in side surfaces of the first protrusion 10b, and a second shaft member 62 and a bearing member (not illustrated) are fitted in the through-holes. Note that the bearing member may be ball bearings, for example.

Moreover, the linear-movement actuator 30 is fixed to an upper part of the first body part 10a by a pair of fixing parts 11. Note that a configuration of the linear-movement actuator 30 will be described later.

The second link member 20 has a second body part 20a and a second protrusion 20b. The second body part 20a is formed in a bar shape (rectangular parallelepiped shape), and the second protrusion 20b is provided to a front surface of an upper end part thereof so as to protrude forward.

Moreover, through-holes (not illustrated) are formed in side surfaces of the upper end part of the second body part 20a, and a fourth shaft member 64 and a bearing member (not illustrated) are fitted in the through-holes. Similarly, through-holes (not illustrated) are formed in side surfaces of the second protrusion 20b, and a third shaft member 63 and a bearing member (not illustrated) are fitted in the through-holes. Note that the bearing member may be ball bearings, for example.

The first link member 10 and the second link member 20 are coupled to each other through the first movable link 40 and the second movable link 50, and the coupled part constitutes the joint structure of the robot. As seen in the left-and-right direction, the first movable link 40 and the second movable link 50 are disposed so as to intersect with each other, when the first link member 10 and the second link member 20 are disposed linearly (see FIGS. 1 to 3). In other words, as seen in the left-and-right direction, the first movable link 40 and the second movable link 50 are disposed so as to intersect with each other, when the first link member 10 and the second link member 20 are disposed so as to extend in the up-and-down direction.

The second movable link 50 has a pair of second movable link members 51A and 51B. The second movable link members 51A and 51B are each formed in a strip shape, and they are disposed so as to sandwich the first link member 10 and the second link member 20 in the left-and-right direction.

Moreover, in both of the second movable link members 51A and 51B, through-holes 52 and 54 are formed in end parts thereof, respectively. The second shaft member 62 and a bearing member 72 are inserted into the through-hole 52. The fourth shaft member 64 and a bearing member 74 are inserted into the through-hole 54. Note that each of the bearing members 72 and 74 may be a ball bearing, for example.

The second shaft member 62 is comprised of a screw and a nut, for example, and jointly fastens the second movable link member 51A, the first link member 10, and the second movable link member 51B. Similarly, the fourth shaft member 64 is comprised of a screw and a nut, for example, and jointly fastens the second movable link member 51A, the second link member 20, and the second movable link member 51B.

Therefore, the second movable link 50 rotatably (pivotably) couples the first link member 10 to the second link member 20 through the second shaft member 62 and the fourth shaft member 64.

As seen in the left-and-right direction, the first movable link 40 is formed so as to be curved in order not to interfere with the second shaft member 62. In other words, as seen in the left-and-right direction, the first movable link 40 is formed in a substantially V-shape.

Moreover, the first movable link 40 has a pair of first movable link members 41A and 41B, and a plate member 42, and the pair of first movable link members 41A and 41B are disposed so as to sandwich the plate member 42 in the left-and-right direction. The first movable link members 41A and 41B and the plate member 42 are fixed by a suitable member (for example, screws).

The first movable link members 41A and 41B each has a body part 3 and an extended part 4. The body part 3 and the extended part 4 are each formed in a strip shape, and a base-end part of the body part 3 (in FIGS. 1 to 3, a lower end part) is connected to a base-end part of the extended part 4 (in FIGS. 1 to 3, a lower end part).

The extended part 4 is formed so as to extend from an end part (base-end part) of the body part 3 on the second link member 20 side toward the first link member 10, when the first link member 10 and the second link member 20 are disposed linearly. In other words, the extended part 4 is formed so as to extend upwardly from the end part (base-end part) of the body part 3 on the second link member 20 side, when the first link member 10 and the second link member 20 are disposed so as to extend in the up-and-down direction.

Through-holes 43 and 44 are formed in both end parts of the body part 3. The third shaft member 63 and a bearing member 73 are inserted into the through-hole 43. Moreover, the first shaft member 61 and a bearing member 71 are inserted into the through-hole 44. Note that each of the bearing members 71 and 73 may be a ball bearing, for example.

The first shaft member 61 is comprised of a screw and a nut, for example, and jointly fastens the first movable link member 41A, the first link member 10, and the first movable link member 41B. Similarly, the third shaft member 63 is comprised of a screw and a nut, for example, and jointly fastens the first movable link member 41A, the first link member 10, and the first movable link member 41B.

Therefore, the first movable link 40 rotatably (pivotably) couples the first link member 10 to the second link member 20 through the first shaft member 61 and the third shaft member 63.

Moreover, a through-hole 45 is formed in a tip-end part of the extended part 4 (in FIGS. 1 to 3, an upper end part). A shaft member 65 and a bearing member 75 are inserted into the through-holes 45. Moreover, the bearing member 75 is penetrated through the tip-end part of the linear-movement actuator 30. The bearing member 75 is comprised of a screw and a nut, for example, and jointly fastens the first movable link member 41A, the linear-movement actuator 30, and the first movable link member 41B.

Here, although the linear-movement actuator 30 is comprised of a drive motor and the ball-screw mechanism, it is not limited to this configuration, but a known linear-movement actuator may also be used. Note that, in Embodiment 1, the linear-movement actuator 30 has a first casing 31, a second casing 32, a drive motor 33, a first pulley 35, a second pulley 36, and a belt 37.

The first casing 31 and the second casing 32 are each formed in a rectangular parallelepiped shape, and are configured telescopically. The pair of fixing parts 11 are attached to both side surfaces of a base-end part of the first casing 31 (linear-movement actuator 30). Further, as described above, the first casing 31 (linear-movement actuator 30) is fixed to a base-end part of the first link member 10 by the pair of fixing parts 11.

Moreover, the drive motor 33 is attached to a front surface of the base-end part of the first casing 31. The first pulley 35 is connected to an output shaft 34 of the drive motor 33. Moreover, a ball-screw mechanism (not illustrated) is disposed inside the first casing 31. The second pulley 36 is connected to a base-end part of a threaded shaft of the ball-screw mechanism, and a base-end part of the second casing 32 is connected to a tip-end part of the threaded shaft. Further, the belt 37 is wound around the first pulley 35 and the second pulley 36. Therefore, the second casing 32 can advance and retreat with respect to the first casing 31. Note that, as for the ball-screw mechanism, a known ball-screw mechanism may be used, and detailed description thereof is omitted.

Note that, although in the joint structure 100 of the robot according to Embodiment 1 the tip-end part of the linear-movement actuator 30 is rotatably connected to the extended part 4 of the first movable link 40, it is not limited to this configuration. For example, the tip-end part of the linear-movement actuator 30 may be rotatably connected to the body part 3 of the first movable link 40. In this case, the tip-end part of the second casing 32 may be inserted into the third shaft member 63.

[Operation of Joint Structure of Robot]

Next, operation of the joint structure 100 of the robot according to Embodiment 1 is described with reference to FIGS. 1 to 7.

First, as illustrated in FIGS. 1 to 3, in the joint structure 100, suppose that the first link member 10 and the second link member 20 are disposed linearly. Further, suppose that an instruction signal for bending the joint is outputted to the linear-movement actuator 30 from a control device (not illustrated).

Then, the drive motor 33 of the linear-movement actuator 30 drives to extend the second casing 32 with respect to the first casing 31. Therefore, as illustrated in FIGS. 4 and 6, the second link member 20 pivots and becomes in a bending state with respect to the first link member 10. Note that, as illustrated in FIG. 4, an angle of the second link member 20 pivoted with respect to the first link member 10 from the linearly-disposed state to the bending state is expressed as a joint angle (bending angle; 50°.

Moreover, when the drive motor 33 of the linear-movement actuator 30 drives, the joint angle increases as illustrated in FIGS. 5 and 7 (in FIG. 5,) 140°.

Next, as illustrated in FIGS. 5 and 7, when the second link member 20 of the joint structure 100 is in the state where it is pivoted with respect to the first link member 10 (a state where the joint is bent), suppose that an instruction signal for causing the linear-movement actuator 30 to extend the joint is outputted from the control device.

Then, the drive motor 33 of the linear-movement actuator 30 rotates in the opposite direction from the bending motion so that the extended second casing 32 contracts. Therefore, the bent joint becomes in an extended state.

[Operation and Effects of Joint Structure of Robot]

Next, operation and effects of the joint structure 100 of the robot according to Embodiment 1 is described with reference to FIGS. 1 to 9.

First, a configuration of a joint structure of a robot of Comparative Example is described with reference to FIG. 8.

Figure 8:
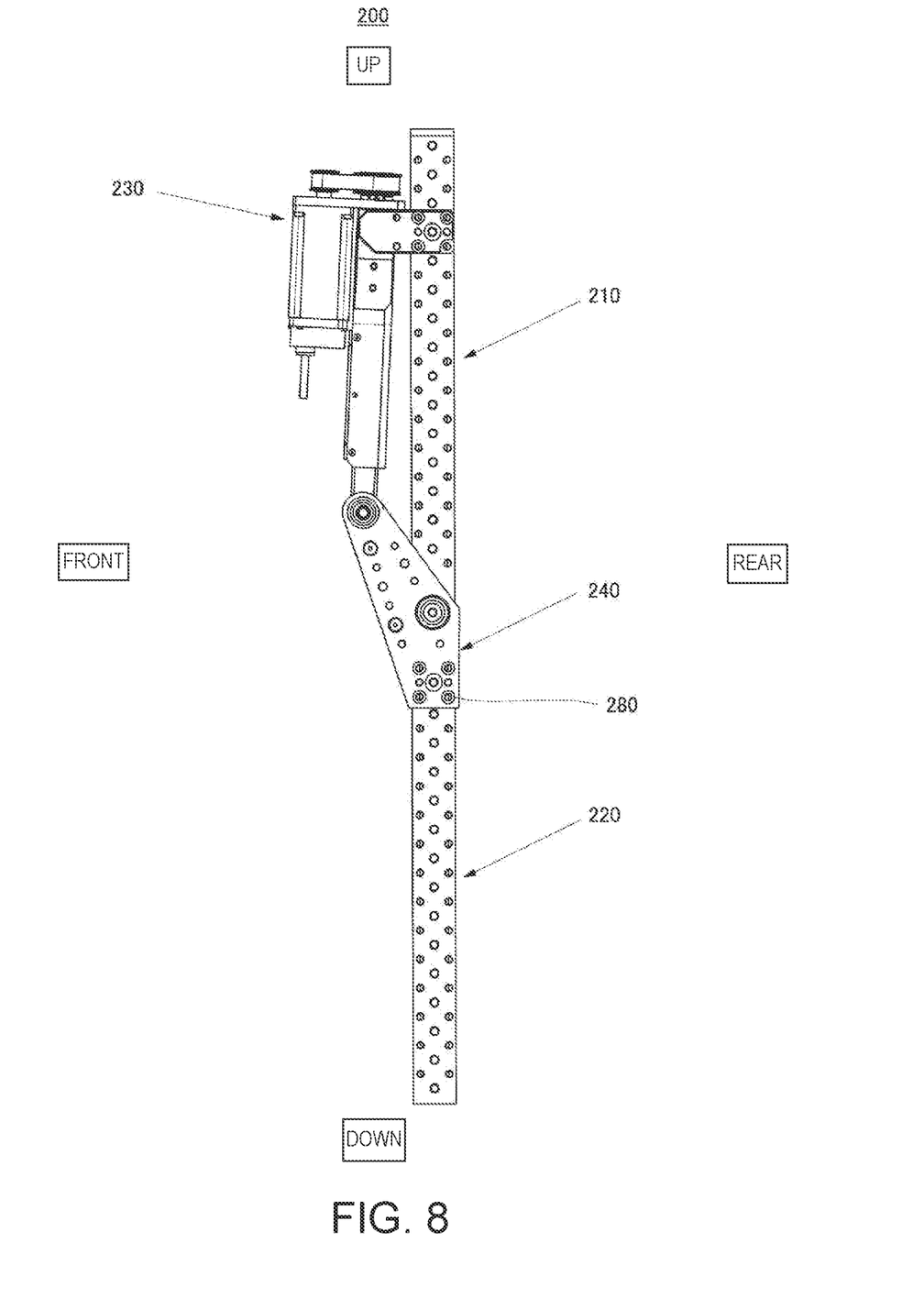
FIG. 8 is a schematic view illustrating an outline configuration of a joint structure of a robot of Comparative Example.

FIG. 8 is a schematic view illustrating an outline configuration of the joint structure of the robot of Comparative Example. Note that, in FIG. 8, an up-and-down direction and a front-and-rear direction of the joint structure of the robot are expressed as an up-and-down direction and a front-and-rear direction in the drawing.

As illustrated in FIG. 8, the joint structure 200 of the robot of Comparative Example includes a first link member 210, a second link member 220, a linear-movement actuator 230, and a first movable link 240. Fundamentally, it has the same configuration as the joint structure 100 of the robot according to Embodiment 1.

However, the joint structure 200 of the robot of Comparative Example differs in that the first movable link 140 is fixed to the second link member 220 by fixing-part members 280, and the second movable link 50 is not disposed.

As for the joint structure 200 of the robot of Comparative Example and the joint structure 100 of the robot according to Embodiment 1, torque characteristics are calculated and plotted with respect to an output of the drive motor which constitutes the linear-movement actuator, when the joint angle is changed. Moreover, a torque required for the joint structure in order to support the weight of the robot is calculated and plotted, when the first link member is used as an upper thigh, a second link member is used as a lower thigh, and a torso is disposed in an upper part of the first link member.

Figure 9:
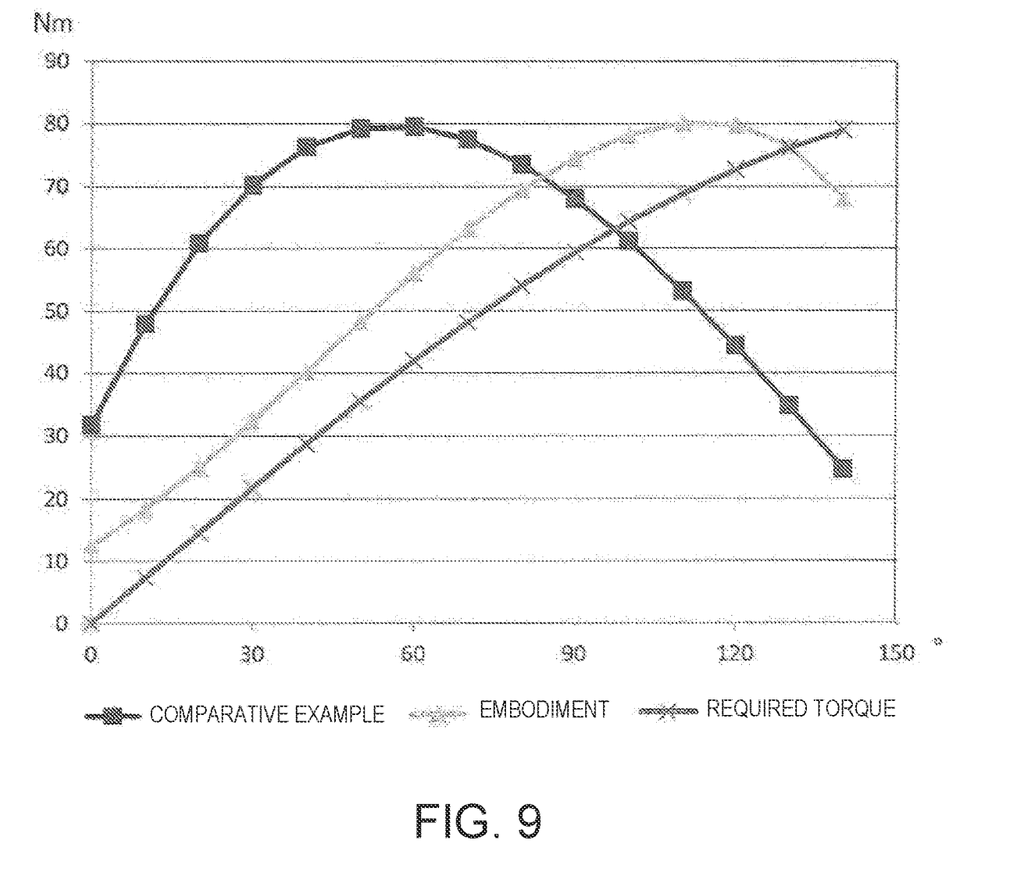
FIG. 9 is a graph illustrating a plotted result of calculating a torque characteristic when a joint angle is changed for the joint structure of the robot according to Embodiment 1 and the joint structure of the robot of Comparative Example, and a plotted result of calculating a torque required for each joint structure in order to support the weight of the robot.

FIG. 9 is a graph illustrating plotted results of calculating the torque characteristics for the joint structure of the robot according to Embodiment 1 and the joint structure of the robot of Comparative Example, when the joint angle is changed, and plotted results of calculating the torque required for the joint structure in order to support the weight of the robot.

As illustrated in FIG. 9, according to the joint structure 200 of the robot of Comparative Example, when the joint angle is small, the sufficient torque can be obtained, but when the joint angle increases, the required torque cannot be obtained.

On the other hand, according to the joint structure 100 of the robot according to Embodiment 1, the required torque can be obtained even if the joint angle increases. This originates in that, in the joint structure 100 of the robot according to Embodiment 1, the first movable link 40 and the second movable link 50 are disposed so as to intersect with each other (so-called "crosslink"). The crosslink has such a feature that a reduction ratio increases rapidly when the output angle becomes a given angle or larger.

Therefore, in the joint structure 100 of the robot according to Embodiment 1, when the joint angle is small, the required torque can be provided by the linear-movement actuator 30, and when the joint angle is large, the required torque can be obtained by the crosslink. Therefore, the required torque can be secured when the bending angle of the joint increases, without increasing the size of the drive motor 33 which constitutes the linear-movement actuator 30, and therefore, the robot can be downsized.

It is apparent for the person skilled in the art that many improvements or other embodiments of the present disclosure are possible from the above description. Therefore, the above description is to be interpreted only as illustration, and it is provided in order to teach the person skilled in the art the best mode that implements the present disclosure. The details of the structures and/or the functions may be changed substantially, without departing from the present disclosure.

INDUSTRIAL APPLICABILITY

Since the joint structure of the robot of the present disclosure can achieve the downsizing of the robot, it is useful in the field of industrial robots.

The invention claimed is:

1. A joint structure of a robot, comprising:
a first link member through which a first shaft member and a second shaft member are inserted;
a second link member through which a third shaft member and a fourth shaft member are inserted;
a first movable link and a second movable link, disposed so as to intersect with each other and configured to rotatably couple the first link member to the second link member through the first to fourth shaft members; and
a linear-movement actuator connected at a base-end part thereof to the first link member,
wherein the first movable link rotatably couples the first link member to the second link member through the first shaft member and the third shaft member,
wherein the second movable link rotatably couples the first link member to the second link member through the second shaft member and the fourth shaft member,
wherein a first part of the first movable link between the first shaft member and the third shaft member intersects with so as to cross a second part of the second movable link between the second shaft member and the fourth shaft member,
wherein a tip-end part of the linear-movement actuator is rotatably connected to the first movable link, and
wherein the second link member relatively pivots to the first link member by the linear-movement actuator advancing and retreating.

2. The joint structure of claim 1, wherein an extended part is provided to an end part of the first movable link on the second link member side, and the tip-end part of the linear-movement actuator is rotatably connected to the extended part.

3. The joint structure of claim 1, wherein the first movable link is formed so as to be curved in order not to interfere with the second shaft member.

4. The joint structure of claim 1, wherein the first movable link is formed in a V-shape.

5. The joint structure of claim 1, wherein an extended part of the first movable link is formed so as to extend toward the first link member, when the first link member and the second link member are disposed linearly.

* * * * *